3,409,454
ALUMINA COATED TiO$_2$ PIGMENTS
Bertha M. Andrew, Wilmington, and Donald J. Smith, Claymont, Del., assignors to E. I. du Pont de Nemours and Company, Wilmington, Del., a corporation of Delaware
No Drawing. Filed Mar. 31, 1965, Ser. No. 444,452
7 Claims. (Cl. 106—300)

This invention relates to the production of titanium dioxide pigments and more particularly to the manufacture of novel alumina-coated TiO$_2$ pigments possessing unexpectedly improved dispersibility characteristics.

Pigmentary titanium dioxide is produced by heat treating (calcining) hydrous titanium oxide obtained by hydrolytic precipitation from titanium salt solutions such as titanium sulfate. Upon calcination under such conditions as to produce a pigmentary product, the hydrous titanium oxide which has been precipitated from titanium sulfate solutions assumes the anatase crystalline modification. Examples of useful procedures for obtaining this form of TiO$_2$ pigment include those set forth in U.S. Reissue Patent 18,854 and U.S. Patent 2,479,637. If conversion of the anatase to rutile should be desired to be effected during the calcination, this may be accomplished at normal pigment calcining temperatures by admixing with the anatase during the heating small amounts of converting agents such as disclosed in U.S. Patent 2,290,539 or 2,369,468. Alternatively TiO$_2$ in the rutile state can be obtained by the oxidation of titanium tetrachloride alone or in conjunction with small amounts of AlCl$_3$, such oxidation being carried out with air or oxygen at a relatively high temperature in the range of from about 800 1350° C. Highly useful methods for effecting such oxidation or cooxidation comprise those disclosed in U.S. Patents 2,488,439 and U.S. 2,559,638.

It is also well known to subject TiO$_2$ pigments to various finishing treatments in order to impart desired stabilization thereto or improve their color, texture, oil absorption and other desired characteristics. In the preparation of TiO$_2$ most suitable for paper coating applications it has been customary to incorporate small amounts of alumina in the pigment to enhance its water dispersibility and viscosity in the coating composition. Thus in effecting intimate association of the alumina with the TiO$_2$ the pigment is admixed with an aqueous solution of an ionizable aluminum compound such as aluminum sulfate, aluminum nitrate, aluminum chloride, and like ionizable salts as well as various aluminates, including sodium aluminate, potassium aluminate, and like compounds sufficient in amount to precipitate on the pigment upon subsequent neutralization of the slurry with caustic to incorporate from about .5–6%, and preferably from about 2–4%, by weight, of Al$_2$O$_3$. In practice it has been customary to add sufficient caustic to the aluminum compound-containing TiO$_2$ slurry to raise the pH thereof to within a range of from 1–10 and to thereafter age and neutralize at various temperatures up to 100° C. The resulting product is then conventionally dried or calcined and the final product recovered.

It has now been discovered that significant, greatly increased and wholly unexpected improvements in the dispersibility characteristics of alumina treated TiO$_2$ pigments, especially alumina treated anatase pigment obtained from a titanium sulfate hydrolysis, can be readily obtained if in lieu of conducting the aging and curing of the treated pigment under prior art conditions, such aging and curing is carried out while maintaining the TiO$_2$ slurry under relatively high pH conditions i.e. of at least 10.5 pH. Accordingly it is among the objects of this invention to provide an improved alumina coated TiO$_2$ pigment exhibiting unexpectedly high dispersibility properties whereby said pigment becomes outstandingly suitable for use in paper manufacture and as an essential component of a paper coating composition employed in conventional or machine coating techniques utilized in paper manufacture. A further object is to provide a novel method for obtaining alumina-treated TiO$_2$ pigment cured and aged under relatively high pH conditions and to provide a TiO$_2$ pigment composition containing alumina as a coating therefor which is predominantly in the form of boehmite (AlO(OH)). Other objects and advantages of the invention will be evident from the ensuing description thereof.

The foregoing objects are realized in this invention which broadly comprises subjecting a suspension of an alumina-treated TiO$_2$ pigment to aging and curing treatment while said suspension is maintained at a pH ranging from 10.5–14 and preferably while said suspension is maintained at a pH ranging from 11–11.5.

In imparting to TiO$_2$ pigments the improved dispersibility properties afforded by this invention reference will be made to the treatment of alumina-treated anatase derived from sulfate process TiO$_2$ manufacture. Such type of pigment has been found to be particularly useful in paper coating applications. It will be understood, however, that the improvement resulting from the high pH treatments herein contemplated are applicable to alumina-treated TiO$_2$ pigments generally, whether the pigments comprise anatase or rutile, or are made up of mixtures of these crystalline modifications. In accordance with its preferred adaptation, an aqueous slurry suspension of pigmentary anatase TiO$_2$ in which from about 100–600 gms./liter of TiO$_2$ and preferably from about 250–450 gms./liter of TiO$_2$ are present is first formed. Alumina, preferably in the form of an alkali metal aluminate, such as sodium aluminate is then added to the slurry in proportions such that the weight of alumina equivalent to the salt, equals from 0.5 to 6% of the weight of the TiO$_2$ present in said slurry. Preferably, such concentration ranges from about 2.8–3.5% and usually about 3%. Adjustment of the slurry to a pH of at least 10.5 and up to 14, and preferably in a range of from 11 to 11.5 is then undertaken by means of addition of a suitable base such as an alkali metal aluminate or hydroxide, of which sodium aluminate and sodium hydroxide are preferred for use. Other useful bases include sodium carbonate, potassium hydroxide, ammonium hydroxide, or the various metal sulfates or sulfides, or mixtures of such bases. If desired, gaseous ammonia can be used when treating relatively cold solutions, with caustic being preferred for employment when the suspension is at relatively high temperatures. Suspension temperatures ranging from about 25–80° C. and up to 100° C., are contemplated. If desired, caustic addition can be made prior to adding the alumina source provided the TiO$_2$ and alumina solution remain in contact at a pH above 10.5.

After the slurry containing the TiO$_2$ and alumina solution is adjusted to a pH of at least 10.5, it is subjected to curing and aging by allowing it to stand for a period of at least 15 minutes, and preferably for a period of 30 minutes, at the treatment temperatures. If desired, longer treating periods and up to about one hour can be resorted to in this step of the process.

Upon attaining desired suspension curing and aging under the specified, critical pH conditions, the lowering of its pH to within a range of from 7 to 8.5 and usually to a range of 7 to 7.8 is undertaken. This can be conveniently effected through acidification by addition of sufficient sulfuric or other mineral acid (hydrochloric, nitric) and, if desired, of Cl$_2$ gas. Where ammonia is present, partial reduction of the pH can be brought about, if desired, by boiling off the ammonia. Upon neutralization being attained, hydrous $Al_2O_3$ is precipitated on and coalesced with the $TiO_2$, and the resulting alumina coated pigment is aged for a period of at least 30 minutes and preferably for a period of about 1 hour. Throughout the foregoing treatments, the slurry suspension is mildly agitated. The suspension is then filtered to recover the coated pigment which is then dried and ground to desired texture and fineness in a conventional manner.

Following recovery of the alumina treated $TiO_2$ pigment, it can be used as an essential pigmenting ingredient in various type coating compositions and especially as a component of compositions employed in producing coated paper through either conventional or machine type coating techniques. In conventional paper coating operations the composition mixture contains about 60–65% water and therefore is very fluid. In machine type coatings, the water content of the mixture may be as low as about 25–45% and therefore is more viscous. In both types of operations the pigments and adhesives, including starch, are first very thoroughly mixed. In such conventional coating, the mixture is applied by drawing the paper across a roll revolving in a trough containing the mixture, or by actually immersing the paper in the mixture and then passing it through squeeze-rolls to remove the excess. After this the coating is more evenly distributed on the surface of the paper by reciprocating brushes, rapidly revolving rolls, or by a sharply defined blast of air. After such smoothing the wet web of paper is led through heated chambers to dry. In machine coating applications, the mixture is applied by squeeze-rolls about mid-way of the paper machine. Because of the low water content and the high pressure during its application, the coating is dry enough as it leaves the coating press so that it can go directly to the drying drums of the paper machine.

To a clearer understanding of the invention the following comparative Table I is given which is demonstrative of the results obtained upon applying the invention to a series of $TiO_2$ slurries prepared and treated as shown in the table. The pigment slurries were made up of anatase $TiO_2$ obtained from a sulfate process similar to that described in U.S. Patent 2,479,637 or comprised rutile $TiO_2$ resulting from the oxidation of $TiCl_4$ in accordance with the procedures of U.S. Patent 2,488,439 or from the co-oxidation of $TiCl_4$-$AlCl_3$ in accordance with the procedures of U.S. Patent 2,559,638. In each instance the slurries were mixed with a solution of an aluminate and stirred while adding sodium hydroxide as a base to adjust the slurry to the pH shown. After a curing treatment for the time period indicated for each slurry, alumina precipitation was effected by sulfuric acid addition, following which the slurry was further aged and for the times and under the temperatures indicated. The pigments were then filtered and recovered from each slurry, dried and conventionally ground and were then tested for dispersibility properties by recourse to standard viscosity measurements to obtain the viscosity centipoise results given. A comparison of the viscosity of the prior art pigments recovered from the slurries M, N, O with those of A to L inclusive will clearly demonstrate the highly improved dispersion properties of the products of this invention aged and cured under the high pH conditions herein contemplated.

TABLE I

| $TiO_2$ Pigment | Type $TiO_2$ | $TiO_2$ Conc., gms./liter | Slurry Temp., °C. | $Al_2O_3$ Source | Percent $Al_2O_3$ in slurry (based on $TiO_2$) | pH Adjusted to— | Cure Time, Mins. | pH Re-adjusted to— | Aging Time, Mins. | Viscosity,[1] Centipoise |
|---|---|---|---|---|---|---|---|---|---|---|
| A | Anatase | 100 | 25 | Sodium aluminate | 5.5 | 10.7 | 30 | 7.3 | 60 | 160 |
| B | do | 250 | 25 | do | 4.0 | 11.1 | 30 | 7.5 | 60 | 120 |
| C | do | 325 | 40 | do | 3.2 | 11.5 | 30 | 8.4 | 60 | 180 |
| D | do | 350 | 40 | do | 3.2 | 11.0 | 30 | 8.4 | 60 | 130 |
| E | do | 600 | 30 | do | 0.5 | 12 | 15 | 8.3 | 30 | 400 |
| F | Rutile anatase | 300 | 30 | do | 1.5 | 11 | 30 | 7.8 | 60 | 410 |
| G | do | 300 | 30 | do | 2.5 | 11 | 30 | 7.8 | 60 | 165 |
| H | do | 300 | 30 | do | 3.5 | 11 | 30 | 7.8 | 60 | 135 |
| I | Rutile | 350 | 25 | do | 2.5 | 11-11.5 | 30 | 7-7.8 | 60 | 150 |
| J | do | 350 | 45 | do | 2.5 | 11-11.5 | 30 | 7-7.8 | 60 | 160 |
| K | do | 350 | 65 | do | s | 11-11.5 | 30 | 7-7.8 | 60 | 140 |
| L | do | 350 | 80 | do | 2.5 | 11-11.5 | 30 | 7-7.8 | 60 | 175 |
| M | Anatase | 350 | 25 | do | 3.0 | 10.0 | 30 | 7-7.8 | 60 | 1,060 |
| N | Rutile (sulfate process) | 350 | 25 | do | 3.0 | 10.0 | 30 | 7-7.8 | 60 | 1,080 |
| O | Rutile | 350 | 25 | do | 3.0 | 10.0 | 30 | 7-7.8 | 60 | 1,100 |

[1] Viscosity was measured in standard type Brookfield viscosimeters employing a pigment slurry which was mixed for 20 minutes with water containing 0.4% $Na_6P_6O_8$ and 75% $TiO_2$ solids.

Each of the treated $TiO_2$ pigments of Table I, on X-ray analysis, was found to contain alumina in the form of a hydrogel of amorphous alumina and in the crystalline modification AlO(OH) (boehmite).

Each was also subjected to analysis by gas chromatographic dehydration and differential thermal analysis techniques. Exothermic changes occurring at $\approx 130°$ C. and $\approx 370°$ C. indicated that the pigments A to L inclusive contained an amount of AlO(OH) exceeding the quantity contained as amorphous hydrogel. The quantity of AlO(OH) present was estimated to range from 50% to 75% by weight of the coating present. The pigment treatments, M, N, O, representing prior art treatments, contained considerably less boehmite, i.e. ranged from 25 to 40% of the total. The total alumina coating on said pigments was found to range from 0.5 to 5% of the total, calculated as $Al_2O_3$.

We claim our invention:

1. A $TiO_2$ pigment exhibiting increased water dispersibility characteristics, said pigment being coated with from .5 to 6%, by wight, of aluminum oxide, of which oxide at least 50% is in the form of AlO(OH).

2. A $TiO_2$ pigment exhibiting increased water dispersibility characteristics, said pigment being coated with from .5 to 6%, by weight, of aluminum oxide, of which oxide from 50–75% is in the form of AlO(OH).

3. An anatase $TiO_2$ pigment exhibiting increasd water dispersibility characteristics, said pigment containing a coating of from 2–4%, by weight, of aluminum oxide, of which oxide at least 50% is in the form of AlO(OH).

4. A process for producing an alumina-coated $TiO_2$ pigment exhibiting increased water dispersibility charateristics, which comprises forming an aqueous $TiO_2$ pigment suspension containing a solution of an ionizable aluminum compound sufficient on neutralization to precipitate on said pigment from .5 to 6%, by weight, of $Al_2O_3$, curing and aging said suspension for a period of at least 15 minutes while maintaining it under a pH of at least 10.5, thereafter lowering said pH to within a range of from 7 to 7.8 and further aging the neutralized slurry, and thereafter recovering the resulting alumina-coated $TiO_2$ pigment.

5. A process for producing an alumina-coated $TiO_2$ pigment exhibiting increased water dispersibility characteristics, which comprises forming an aqueous $TiO_2$ pigment suspension containing a solution of an ionizable aluminum compound sufficient on neutralization to precipitate on said pigment from 2 to 4%, by weight, of $Al_2O_3$, curing and aging said suspension for a period of at least 15 minutes while maintaining it under a pH of at least 10.5, thereafter lowering said pH to within a range of from 7 to 7.8 and further aging the neutralized slurry, and thereafter recovering the resulting alumina-coated $TiO_2$ pigment.

6. A process for producing an alumina-coated $TiO_2$ pigment exhibiting increased water dispersibility characteristics comprising forming an aqueous slurry suspension containing from about 100–600 gms./liter of $TiO_2$ together with a solution of an ionizable aluminum compound sufficient in amount to precipitate on neutralization of said suspension from about .5 to 6%, by weight, of $Al_2O_3$ on said $TiO_2$, subjecting said suspension to curing and aging treatment for a period of at least 15 minutes while maintaining the suspension at a pH ranging from 10.5 to 14, thereafter lowering said pH to within a range of from 7 to 7.8 and subjecting the neutralized slurry to further aging treatment, and thereafter recovering the resulting alumina-coated $TiO_2$ pigment.

7. A proces for producing an alumina-coated $TiO_2$ pigment exhibiting increasd water dispersibility characteristics comprising forming an aqueaus slurry suspension of pigmentary anatase $TiO_2$ in which from about 250–450 gms./liter of said $TiO_2$ are present together with a solution of an alkali metal aluminate sufficient in amount to precipitate on said $TiO_2$ on neutralization of said slurry from about 2 to 4%, by weight, of $Al_2O_3$, subjecting said slurry to curing and aging treatment for a period of at least 15 minutes while maintaining the same at a pH ranging from 10.5 to 14, thereafter lowering the pH of said slurry to within a rang of from 7 to 7.8 and subjecting the neutralized slurry to further aging treatment for a period of at least 15 minutes, and thereafter recovering the resulting alumina-coated $TiO_2$ pigment.

References Cited

UNITED STATES PATENTS

| 2,357,101 | 8/1944 | Geddes | 106—300 |
| 2,671,031 | 3/1954 | Whately | 106—300 |
| 3,220,867 | 11/1965 | O'Shaughnessy | 106—308 |
| 1,368,392 | 2/1921 | Farup. | |
| 2,284,772 | 6/1942 | Seidel. | |

FOREIGN PATENTS

| 671,179 | 9/1963 | Canada. |

TOBIAS E. LEVOW, *Primary Examiner.*

SAMUEL E. MOTT, *Assistant Examiner.*